UNITED STATES PATENT OFFICE.

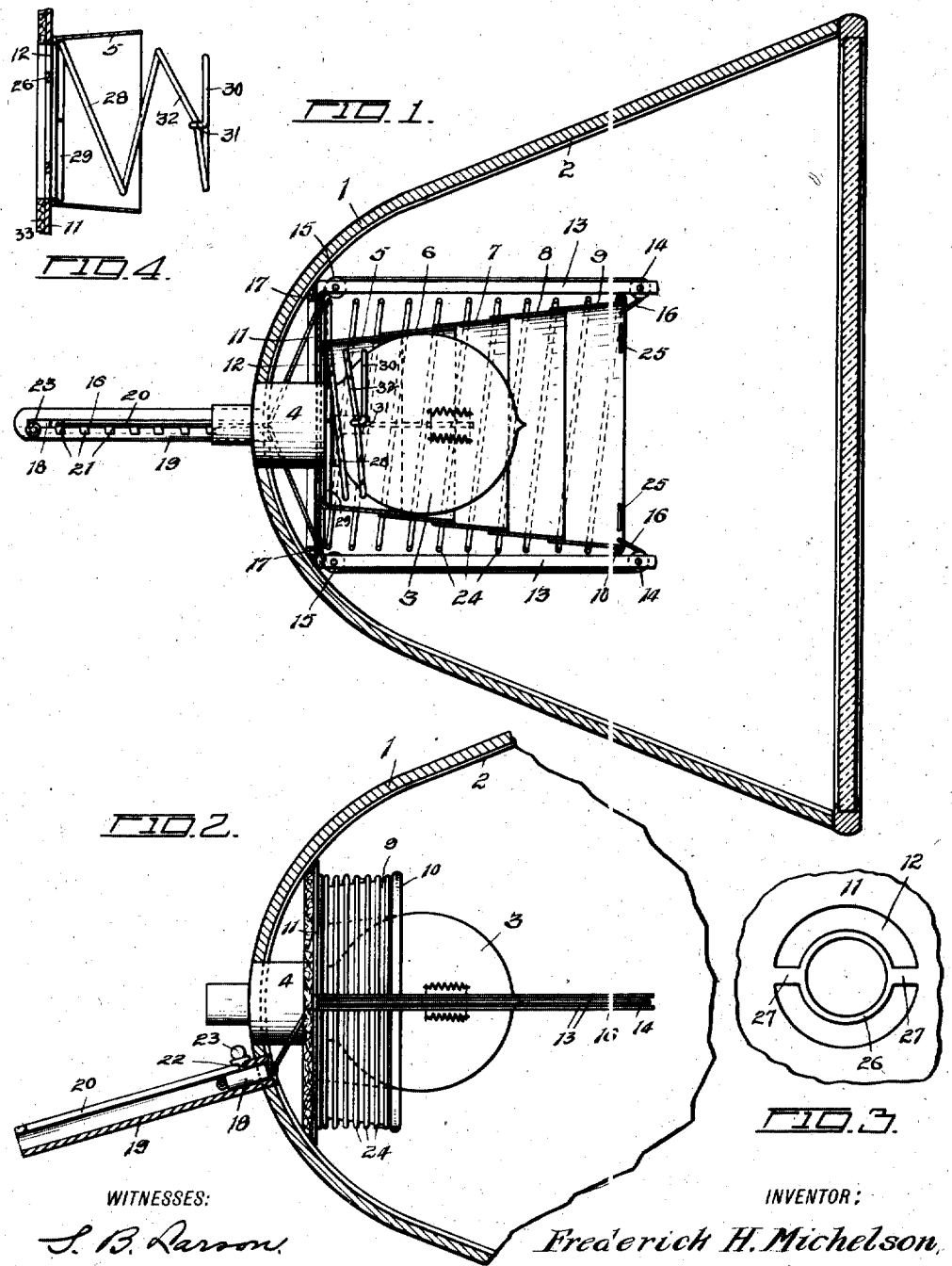

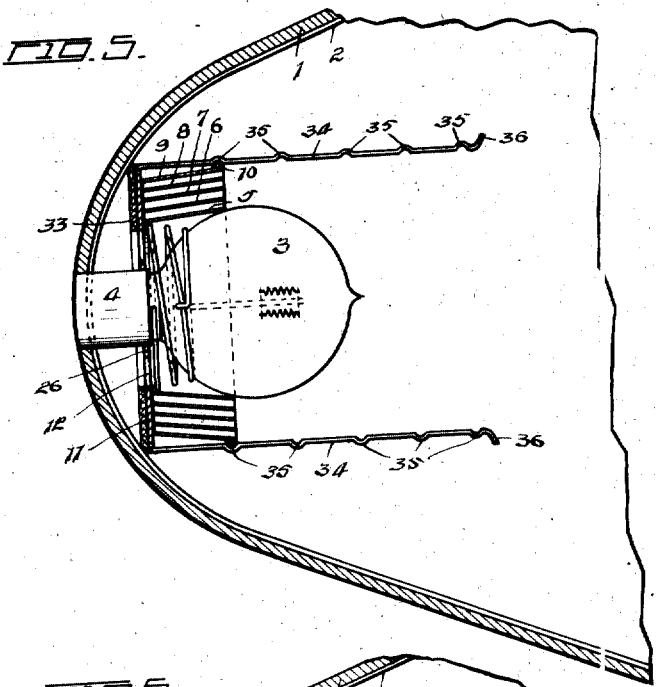
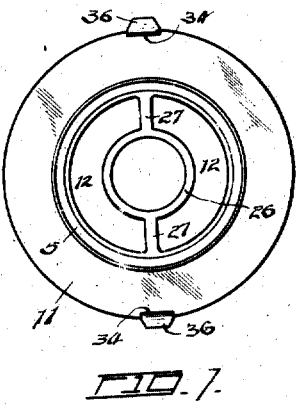
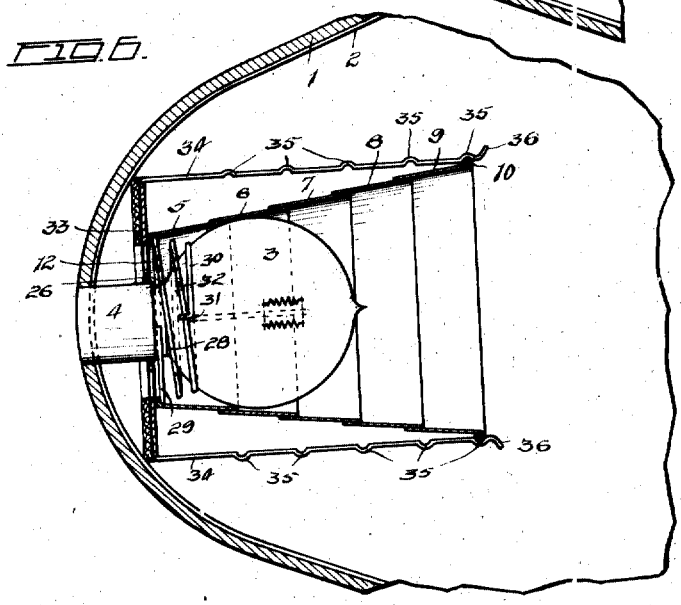

FREDERICK H. MICHELSON, OF DENVER, COLORADO.

AUTOMOBILE-HEADLIGHT DIMMER.

1,222,013.	Specification of Letters Patent.	Patented Apr. 10, 1917.

Application filed September 7, 1915. Serial No. 49,146.

*To all whom it may concern:*

Be it known that I, FREDERICK H. MICHELSON, a citizen of the United States, residing at Denver, in the county of Denver and State of Colorado, have invented a new and useful Automobile-Headlight Dimmer, of which the following is a specification in such clear terms as will enable those skilled in the art to which the invention appertains to construct and use the same.

My invention relates to improvements in automobile head-light dimmers.

The object of my invention is to provide a collapsible dimmer adapted to be held in position within the head-light adjacent the electric light-globe, by means of the electric light-globe and a resilient coiled holder.

A further object of the invention is to provide resilient means for normally holding the dimmer in a collapsed position.

A further object of the invention is to provide suitable means for adjusting the collapsible dimmer to any desired position, including positions intermediate its extreme closed or open position to permit the desired rays of light from the electric light-globe to be reflected by means of the reflector, if any.

A further object of the invention is to provide means to destroy all rays of reflection, if desired.

A still further object of the invention is to provide a collapsible dimmer which will be neat, simple, and comparatively inexpensive in construction, easily installed in automobile head-lights, and a dimmer which will be highly efficient in its results.

With the above and other objects in view as will be apparent as the description proceeds, the invention consists in certain new and novel constructions, combinations and arrangements of parts that I shall hereinafter fully describe and finally point out in the claims hereto appended.

Referring to the accompanying drawing forming a part of this specification wherein like characters of reference denote similar parts throughout the several views:

Figure 1, is a vertical sectional view of an electric-lighted automobile head-light provided with my collapsible dimmer in an extended position permitting no light rays from the electric-globe to be reflected by the reflector.

Fig. 2, is a plan view of my dimmer in a collapsed position, thereby permitting the electric light rays to be reflected by means of the reflector.

Fig. 3, is a detail showing the collar support spanning the central opening of the base.

Fig. 4, is a side elevation of the collar support and the dimmer supporting coiled spring-holder.

Fig. 5, is a modification, in plan view, of my invention for adjusting and holding the collapsible dimmer-rings in their adjusted position; the rings being shown in their collapsed position.

Fig. 6, is a similar view thereof with the collapsible dimmer-rings fully extended.

Fig. 7, is a front elevation of the base and resilient dimmer-ring guide-arms.

Referring to the accompanying drawing, the reference character 1 designates an ordinary automobile head-light, 2 the reflector, 3 the electric light-globe, and 4 the electric-socket.

In carrying out the aim of my invention, I employ a collapsible dimmer consisting of a plurality of tapered concentrically arranged preferably aluminum rings 5, 6, 7, 8, and 9. The rings each being tapered and each slightly larger in diameter than the other, they form a dimmer which can be very easily and readily collapsed.

Ring 9 is preferably provided with the outer rolled edge 10.

The smallest ring designated 5 is suitably secured to a base plate 11. The base plate 11 is preferably provided with a central opening 12 adapted to register with the opening of ring 5. While the light rays may shine upon the reflector through the opening 12, it will not reflect strong or bright rays owing to the fact that the electric light globe 3 interferes therewith, as is manifest. Where I find it desirable not to make the opening 12 as large as the small end of ring 5, I only make it large enough to let the socket 4 pass therethrough. The small ring 5 where it is desirable may be provided with a partial bottom with an opening the same size in diameter as opening 12.

The base plate 11 is provided with a pair of opposed, preferably integral, substantially U-shaped in cross-section, forwardly extending arms 13. These arms 13 extend forward a distance a little greater than the rolled edge 10 of ring 9 when in its open or extreme extended position, as clearly shown in Fig. 1, of the drawing.

A suitable roller 14 is rotatably carried by the arms 13 near their free ends, and a roller 15 is rotatably carried by each arm near the base-plate 11.

A pair of suitable opposed cords 16 are secured to the edge of ring 9. These cords 16 are adapted to pass over the rollers 14 and 15 and then through suitable openings 17 in the base 11 and finally connect to a suitable slidable plug 18.

Plug 18 is slidably mounted within a suitable tubular member 19, which member is suitably secured to the head-light lamp housing 1. The tubular member 19 is provided with a longitudinally slotted opening 20 having a plurality of suitably spaced side notches 21.

The sliding plug 18 is preferably provided with the stud 22, which stud is adapted to pass through the slotted opening 20. The plug 18 is provided with a suitable finger-knob 23.

The plug 18 may be actuated, if desired, by connecting a suitable wire thereto which is concealed in a suitable flexible-tube, which tube may be run to the dash of the car. This arrangement obviates the necessity of getting out of the car to adjust the dimmer when adjusting is desired.

A suitable coiled spring 24 or its equivalent is employed to encircle the collapsible-dimmer, as clearly shown in the drawing. One end of the spring 24 is preferably within the rolled edge 10 of ring 9, although other means of fastening the spring to the ring 9 may be employed, if desired. The opposite end of the coiled spring 24 is suitably secured to the base plate 11. The spring 24, it will be observed, will normally keep the rings in a collapsed position, as clearly shown in Fig. 2, owing to the fact that the spring is fastened at one end to the stationary base-plate 11 and at its opposite end to the collapsible outer or end ring 9.

Ring 9 is further provided with a plurality of suitable wire fingers 25 adapted to extend inwardly and engage the forward edge of each of the rings 8, 7, and 6 during the collapsing operation of the dimmer so that all rings will be positively collapsed and held from working forward after being collapsed.

When it is desired to dim the lights by preventing the reflection thereof, as shown in Fig. 1, of the drawing, the operator merely pulls the knob 23 back to the position shown in Fig. 1. The rings comprising the dimmer through this operation will be extended to their extreme open position thus dimming the light entirely, as is manifest, as no rays of the light are allowed to shine upon the reflector 2.

When the reflection of the light is only to be partially dimmed, the operator turns the stud 22 into the desired notch 21 along the side edge of the slotted opening 20 of the tubular member 19. This arrangement of adjusting rings and holding them in their adjusted position enables the operator to secure any desired amount of reflection desired.

When it is desired to entirely collapse the dimmer, the operator merely releases the stud 22 from its retaining notch 21 and the spring 24 will cause the rings to collapse into one another, as is manifest.

It will be remembered that my improved dimmer positively removes all possible reflection and flicker of the head-lights when the dimmer is adjusted into its extreme open or extended position.

It will also be remembered that the reflection or brightness of the head-lights may be regulated to any desired brightness by adjusting the dimmer-rings into any desired extended position.

To assist in supporting of the dimmer proper in position, I preferably employ a narrow collar 26 having the connecting arms 27. These arms 27 are adapted to be connected with the base 11, as clearly shown in Fig. 3. The collar 26 is adapted to be arranged centrally with relation to the opening 12 of base 11. The collar 26 is further adapted to slip over the socket 4 and be supported thereby to assist in centralizing the dimmer.

To further assist in supporting the dimmer and holding it in position around or adjacent the globe 3, I employ a suitable, preferably coiled spring-wire member 28. The larger or base coil 29 thereof is adapted to frictionally engage the inner surface of the fixed ring 5 near the base 11, as is manifest. The extremity of the small coil 30 of the coiled spring member 28 is preferably provided with a suitable loop 31, which loop is preferably adapted to receive the adjacent coil 32. This arrangement, it will be observed permits the coil 30 to be decreased or increased in diameter by sliding the coil 32 through the loop 31 to a position to properly fit or engage the globe 3 employed, as manifest.

The spring supporting member 28, it will be observed owing to its resiliency also permits the lamp 3 to be properly focused to give the desired results as to light rays or reflection.

The spring supporting member 28 also assists in properly supporting the dimmer in position as the pad 33 of the base 11 is yieldingly and frictionally held in engagement with the reflector 2 by means of the globe 3 compressing the spring member 28, as is manifest. The pad 33 is preferably employed to prevent any scratching of the reflector by the base 11. The pad 33 is not absolutely necessary however, but preferable.

It will be clearly understood that the dimmer is yieldingly held in position by means of the coiled spring member 28 which engages the fixed dimmer-ring at one end and the globe 3 at its opposite end. Some styles of electric light-globes 3, such for instance as the round one illustrated will permit the forward edge of the fixed dimmer-ring to engage the same, while other styles of globes will not permit of this engagement.

Referring to the modification of my invention, shown in Figs. 5, 6 and 7, the reference character 34 designates a pair of opposed resilient, forwardly extending-arms. These arms may be either integral with the base 11 or suitably secured thereto by any well known fastening means.

Each of the resilient supporting arms 34 is provided at suitable intervals along its inner face with a plurality of depressions or notches 35 into which is adapted to seat the rolled-edge 10 of the outer dimmer-ring 9, for normally holding the rings in their adjusted position, especially the outer ring 9, as is manifest.

The arms 34 being formed from resilient or springy material, and especially flat stock they naturally have a tendency to yield inwardly thereby holding the notches 35 frictionally in contact or engage with the rolled-edge 10 of the outer dimmer-ring 9.

The forward extremities of the arms 34 are each preferably provided with the outwardly bent lip or finger-piece 36, to permit the operator to easily and readily spread the arms 34 when re-adjusting the dimmer-rings.

It will be readily seen that the modified form of my invention will produce the same results as the form shown in Figs. 1 and 2 of the drawing. The only difference being in the means for adjusting the dimmer-rings and holding them in their adjusted position. The one style may be adjusted from the dash of the car, or from the outside of the lamp-casing, while the modified form of my invention necessitates the lamp-doors being opened to adjust the dimmer-rings.

I am aware that there may be various slight changes made in the construction of my collapsible dimmer and in the exact arrangements and combinations of parts, hence I do not wish to confine myself to the exact constructions and arrangements of parts shown and described, but reserve the right to make any such changes as may fairly fall within the scope and spirit of my invention, namely, a collapsible dimmer.

The many advantages of the herein described collapsible dimmer will readily suggest themselves to those skilled in the art to which the invention relates.

What I claim is:

1. In an automobile head-light dimmer, the combination with an electric-light globe and a reflector, of a tubular collapsible dimmer and resilient means engaging said globe and said dimmer for holding the dimmer in position against the reflector.

2. In an automobile head-light dimmer, the combination with an electric-light globe and a reflector, of a tubular collapsible dimmer mounted to surround the rear portion of the globe when in a collapsed position, resilient means for holding the dimmer against the reflector and in position around the electric-light globe and means for retaining said dimmer in any desired extended position around the electric-light globe.

3. In an automobile head-light dimmer, the combination with an electric-light globe and a reflector, of a collapsible tubular dimmer, means for supporting said dimmer around the electric-light globe either in extended or collapsed position and in engagement with the reflector adjacent the rear of the electric-light globe, means for opening said dimmer into any desired extended position around the electric-light globe, means for holding said dimmer in any desired extended position around the globe and means for collapsing said dimmer and retaining the same in a collapsed position around the rear portion of the globe.

4. A head-light dimmer comprising a cup-like body consisting of a plurality of tapered rings, means for collapsing said body, and means for extending said body to any desired open position.

5. The combination with an electric-light globe and an automobile head-light reflector, of a head-light dimmer comprising a base having a central opening, an inner tapered ring secured to said base, said ring being adapted to be engaged by the electric-light globe for holding the base in engagement with the reflector for holding the dimmer in position, an outer tapered ring, and a plurality of intermediate tapered rings, said outer ring and said intermediate tapered rings being capable of being collapsed over the inner ring and adapted when in an extended position to retain said extended position until collapsed.

6. In an automobile head-light dimmer, the combination with an electric-light globe and a reflector, of a collapsible cup-shaped metallic body capable of being extended to any desired open position to permit any desired rays of light to be reflected and means for holding said body in a position around the electric-light globe and in contact with the reflector adjacent the rear portion of the globe whether in an extended or a collapsed position.

7. In an automobile head-light dimmer, the combination with an electric-light globe and a reflector, of a collapsible dimmer comprising a base having a central opening, a tapered inner ring secured to said base, a plurality of tapered rings collapsible around said inner ring, a resilient means encircling said rings secured at one end to said base and at the opposite end to the outer ring, said resilient means being adapted to normally hold the rings in a collapsed position, means to prevent the forward movement of any of the intermediate rings while in a collapsed state, a pair of opposed arms extending forward from said base, a pair of rollers rotatably mounted in each arm, a cord adapted to pass over the rollers of each arm and connected at one end to the outer ring, ring adjusting means to which the opposite end of each cord is connected, and means for holding said ring adjusting means in any desired adjusted position.

8. An automobile head-light dimmer comprising a tubular collapsible body consisting of a plurality of rings adapted to be held either in a collapsed or an extended position around an electric-light globe.

9. An automobile head-light dimmer comprising a base having a central opening, an inner tapered ring secured to said base, an outer tapered ring of greater diameter than said inner ring, and a plurality of intermediate tapered rings, said outer ring and intermediate rings being capable through frictional contact with each other when in an extended position to retain said extended position until collapsed.

10. An automobile head-light dimmer comprising a base having a central opening, a pair of forwardly extending arms connected to said base, a pair of rollers rotatably mounted upon each arm, an inner tapered ring secured to said base, an outer tapered ring of greater diameter than said inner ring, a plurality of intermediate tapered rings, a coiled spring encircling said rings and secured at one end to said base and at its opposite end to said outer ring for normally holding the outer ring and intermediate rings in a collapsed position, manually operated means connected at one end to said outer ring and adapted to work over the aforesaid rollers of each arm for opening said outer ring and intermediate rings to any desired extended position, and means for holding said dimmer in position around an electric head-light globe.

11. In an automobile head-light dimmer, the combination with an electric light-globe, electric socket and reflector, of a collapsible dimmer, means adapted to engage the electric-socket for partially supporting the dimmer, and a resilient yielding supporting means adapted to engage the electric light-globe and be compressed thereby for yieldingly supporting the dimmer in position around the electric light-globe.

12. An automobile head-light dimmer comprising a base having a central opening, a looped supporting member adapted to span said central opening, an inner dimmer-ring secured to said base, a plurality of collapsible dimmer-rings, means for collapsing said collapsible dimmer-rings, means for opening said collapsible dimmer-rings to any desired extended position, and a resilient dimmer supporting means arranged within said inner dimmer-ring.

13. In an automobile head-light dimmer, the combination with an electric-light globe and a reflector, of collapsible means to intercept the rays of light to the reflector comprising a perforated base and a plurality of collapsible rings, yieldable supporting means and yieldable retaining means.

14. In an automobile head-light dimmer, the combination with an electric-light globe and a reflector, of collapsible means to intercept the rays of light to the reflector, comprising a perforated base and a plurality of collapsible rings and yieldable supporting means for holding said collapsible means in either an extended or a collapsed position around the electric-light globe.

15. In an automobile head-light dimmer, the combination with an electric-light globe and a reflector, of tubular non-translucent collapsible means to intercept the rays of light to the reflector comprising a perforated base and a plurality of collapsible rings and yieldable supporting means for holding the dimmer in position around the source of light and to permit focusing of the head-light without disturbing the position of the dimmer.

16. An automobile head-light dimmer comprising a base having a central opening, fixed dimming means, collapsible dimming means, yielding supporting means, and resilient retaining means for holding the collapsible dimming means in various adjusted positions.

17. An automobile head-light dimmer comprising a supporting base, a fixed dimmer-ring secured thereto, and a plurality of collapsible dimmer-rings capable of being collapsed over said fixed dimmer-ring.

18. An automobile head-light dimmer comprising a supporting base having a central opening, a collar spanning said opening, a fixed dimmer-ring, a plurality of collapsible dimmer-rings, and dimmer yielding supporting means.

19. An automobile head-light dimmer comprising a hollow collapsible body and yieldable supporting means adapted to support said body within an automobile head-light lamp in collapsible relation with the source of light in said lamp.

20. An automobile head-light dimmer comprising a tubular collapsible body, yieldable supporting means and means adapted to hold said collapsible body in various adjusted positions around a source of light to intercept the rays of light to a reflector to regulate the glare therefrom.

21. An automobile head-light dimmer comprising a collapsible body consisting of a stationary inner ring, and a plurality of collapsible rings.

22. In combination with an electric lamp socket, electric-light globe and a reflector, of a supporting base, a plurality of collapsible encircling rings adapted to be adjusted to dim the glare from said reflector by intercepting the rays of light to the reflector and yieldable supporting means therefor.

23. The combination with an electric lamp socket, electric-light globe and a reflector, of a collapsible tapered body consisting of a plurality of ring-like members and yieldable supporting means for supporting said body around the electric-light globe and holding one end of the body in contact with the reflector adjacent the rear portion of the electric-light globe.

24. An automobile head-light dimmer comprising a base having a central opening, a supporting collar spanning said opening, a pad secured to said base, a dimmer-ring fixed to said base, a plurality of collapsible dimmer-rings, means for yieldingly holding said dimmer in position, and resilient means for normally holding said collapsible dimmer-rings in a collapsed or any desired extended position.

25. A head-light dimmer comprising a perforated stationary base and a plurality of ring elements constituting a collapsible body adapted for adjustment around a source of light.

26. A head-light dimmer comprising a perforated base, an adjustable collapsible body consisting of a plurality of ring elements and means for holding said ring elements in any desired extended position around a source of light.

27. A head-light dimmer comprising a perforated base, a plurality of collapsible ring-like members, means for holding said ring-like members in an adjusted position with relation to a source of light and yieldable supporting means for holding the dimmer in position around the source of light.

28. The combination with an electric head-light having a parabolic reflector and an electric light globe, of a collapsible cup shaped body having an open outer end and a perforated base, through which perforated base the rays of light from said electric light globe are adapted to pass to be reflected, and elastic means interposed between said base and the electric light globe for supporting said collapsible cup shaped body in position around the light globe and said perforated base against the reflector.

29. In combination with an electric head-light having a reflector and a source of light, of a cup-shaped body having a perforated base through which the rays of light are adapted to pass to be reflected, and a spring interposed between said base and the source of light for holding said body around the source of light to intercept the light rays to the reflector, excepting those light rays directed to that portion of the reflector directly to the rear of the source of light.

30. An electric head-light dimmer comprising a tapered cylindrical body consisting of a series of overlapping rings, the smaller end of the body being perforated to permit the light-rays from a source of light to pass through the smaller end of the body to be reflected.

31. In combination with an electric head-light, for automobiles, having a reflector and a source of light, of a cylindrical telescopic body having an entirely open end and a perforated end, and an elastic means interposed between said source of light and the perforated end of said telescopic body for yieldingly supporting said telescopic body in position around the source of light to intercept the rays of light to the reflector, excepting those rays of light adapted to be reflected through the open end of the telescopic body directly from the rear of the source of light.

In testimony whereof I hereunto affix my signature in the presence of two subscribing witnesses.

FREDERICK H. MICHELSON.

Witnesses:
 FURMAN R. CLINE,
 FRED'K J. LARSON.